United States Patent [19]

Kolich et al.

[11] Patent Number: 5,006,324
[45] Date of Patent: Apr. 9, 1991

[54] POLYMERIZATION OF PHOSPHONITRILIC CHLORIDE

[75] Inventors: Charles H. Kolich, Baton Rouge, La.; Bernard R. Meltsner, Royal Oak, Mich.; Henry G. Braxton, Jr., Baton Rouge, La.

[73] Assignee: Ethyl Corporation, Richmond, Va.

[21] Appl. No.: 569,611

[22] Filed: Jan. 10, 1984

Related U.S. Application Data

[63] Continuation-in-part of Ser. No. 126,336, Mar. 3, 1980, abandoned, which is a continuation-in-part of Ser. No. 695,791, Jun. 14, 1976, abandoned, which is a continuation-in-part of Ser. No. 512,613, Oct. 7, 1974, abandoned.

[51] Int. Cl.$^5$ ............................................... C01B 25/10
[52] U.S. Cl. .................................................... 423/300
[58] Field of Search ........................................ 423/300

[56] References Cited

U.S. PATENT DOCUMENTS

| | | | |
|---|---|---|---|
| 3,026,174 | 3/1962 | Paddock | 423/300 |
| 3,407,047 | 10/1968 | Paddock | 423/300 |
| 3,515,688 | 6/1969 | Rose | 423/300 X |

*Primary Examiner*—Gregory A. Heller
*Attorney, Agent, or Firm*—Joseph D. Odenweller

[57] ABSTRACT

High molecular weight phosphonitrillic chloride polymers that are soluble in benzene, toluene and tetrahydrofuran, tetrameric phosphonitrilic chloride, or mixtures thereof at elevated temperatures in the presence of a catalytic amount of an aprotic Lewis acid halogen acceptor. For example, soluble high molecular weight phosphonitrillic chloride can be made by heating the aforementioned trimer at 220°–270° C. in the presence of 5–1000 ppm of $AlCl_3$.

23 Claims, No Drawings ively as would<br>
POLYMERIZATION OF PHOSPHONITRILIC CHLORIDE

CROSS-REFERENCE TO RELATED APPLICATION

This application is a Continuation-in-part of copending application Ser. No. 126,336, filed Mar. 3, 1980 now abandoned which in turn is a continuation-in-part of application Ser. No. 695,791, filed June 14, 1976, now abandoned, which in turn is a continuation-in-part of application Ser. No. 512,613, filed Oct. 7, 1974, now abandoned.

BACKGROUND OF THE INVENTION

The polymerization of phosphonitrilic chlorides has been known for a long time; for example, see Audrieth et al, *Chem. Rev.* 32, pages 119–122 (1943). That reference discloses "phosphonitrilic chlorides form as complete a polyhomologous series as is known in the realm of chemistry". Besides mentioning the compounds $[PNCl_2]_n$ where $n=3$ to 7, it refers to various polymeric types, viz, oil, gums, waxes, inorganic rubber, and an infusible non-elastic material.

The polymerization of phosphonitrilic chlorides to high polymers has been subjected to intensive study; confer Chapters 15 and 16 of Allcock, H. R., *Phosphorus-Nitrogen Compounds*, Academic Press, New York, N.Y. (1972).

Although the elastomeric and high temperature properties of high molecular weight phosphonitrilic chloride have attracted wide attention, use as an everyday plastic has been hampered by hydrolytic instability; Allcock, supra, pages 354 et seq; and Allcock, *Scientific American*, pages 66–74 (71) (March, 1974). As mentioned by these references, the hydrolytic sensitivity is associated with phosphorus-halogen bonds, and replacement of the halogens with non-hydrolyzable organic groups improves the stability to moisture.

As further discussed by the Allcock references mentioned above and Selwyn H. Rose U.S. Pat. No. 3,515,688, useful polymers with suitable organic groups can be prepared from soluble, high molecular weight phosphonitrilic chlorides. Directions for forming such materials are given in Example 1 of Rose and on pages 309 and 310 of Allcock's book, supra.

The process of our invention is admirably suited for the preparation of these materials. Thus, our process provides high molecular weight phosphonitrilic chloride preparations which are soluble in solvents such as benzene, toluene and tetrahydrofuran. Our polymers can be reacted to form fully, or substantially fully substituted organophosphazenes such as those described by Rose, supra, and in Allcock's book, pages 354–361.

Phosphonitrilic chloride polymers which give rise to fully substituted organophosphazenes were first reported in 1965 and 1966; confer Allcock et al, *J. Am. Chem. Soc.* 87, 4216 (1965); *Inorg. Chem* 5, 1709 (1966). For the desired soluble phosphonitrilic chloride precursor, much care is expended in its preparation. For example, reference is made to pages 309–310 of Allcock's book, supra. The starting trimer is recrystallized and decolorized. Small amounts of solvent, $H_2O$, oxygen, $PCl_5$ and linear phosphazene are carefully excluded since they may inhibit the polymerization.

However, even when all such precautions are taken, it is quite common that the phosphonitrilic chloride does not undergo polymerization as desired. Thus, it is recognized that the polymerization procedure can give undesired results inasmuch as the ultimate product possesses properties "which are not as predictable as would be desired"; confer Halasa et al, U.S. Pat. No. 3,829,554, directed to a preliminary heating step which affords a more predictable polymerization.

Our invention can be used to afford a more predictable polymerization. Furthermore, it can be used to prepare a desired soluble high molecular weight phosphonitrilic chloride from a starting material which does not yield acceptable product when polymerized by a prior art method. This is an important aspect of our invention. We are unaware of any other polymerization process which can be used to prepare suitable product from what would otherwise be unsuitable starting material.

Our invention comprises conducting the polymerization reaction in the presence of a very small amount of a halide acceptor such as aluminum chloride. It is surprising that our process yields the desired phosphonitrilic chloride polymer rather than unwanted product. In this regard, reference is made to Paddock, U.S. Pat. No. 3,026,174, which teaches that oil products which are chains of 10–20 $PNCl_2$ units endcapped with the elements of $PCl_5$ or a solid rubber product are formed from trimeric phosphonitrilic chloride and amounts of $PCl_5$ at least ten times greater than what we use to obtain a catalyst effect with $AlCl_3$. Paddock reports in examples 5 and 6 that using $AlCl_3$ at 380,000–1,150,862 parts per million leads to formation of a thick black oil. In addition, Bode et al, Ber. 75, 215 (1942) teaches reaction of $AlCl_3$ with $PNCl_2$ trimer to yield $(PNCl_2)_3 \cdot 2AlCl_3$.

Furthermore, the inventive nature of our process is borne out by page 317 of Allcock's book, supra, which teaches $AlCl_3$, $PCl_5$ and other substances do not behave as catalysts in the polymerization of $(NPCl_2)_3$.

SUMMARY OF THE INVENTION

In a main aspect, this invention pertains to an improvement in a process for preparing high molecular weight, soluble phosphonitrilic chloride polymers. Thus, this invention resides as follows: In a process for the preparation of a soluble, non-oil polymer of high molecular weight from a cyclic phosphonitrilic chloride of low molecular weight, which comprises a polymerization step of heating said chloride at a temperature and for a time sufficient for polymerization of said chloride to said high molecular weight polymer to take place; the improvement comprising (1) conducting said polymerization step in the presence of a catalytic amount of an aprotic Lewis acid, said catalytic amount being less than the amount of said acid which yields end-capped oily polymer as the major product, and (2) separating said soluble high molecular weight polymer from the resultant reaction mixture.

In a preferred embodiment, this invention pertains to a process for the preparation of a non-oil, high molecular weight phosphonitrilic chloride, said process comprising heating a starting material in the substantial absence of oxygen, water, and solvent to a temperature of from about 220° C. to about 300° C., whereby polymerization of said starting material to said high molecular weight product takes place, said starting material being selected from the class consisting of trimeric phosphonitrilic chloride, tetrameric phosphonitrilic chloride, and mixtures thereof, said heating step being conducted in the presence of from about 5 to about 1000 parts per million of an aluminum halide, AlX$_3$, wherein X is a halogen selected from chlorine, bromine, and iodine; and subsequently separating said non-oil, high molecular weight phosphonitrilic chloride from the resultant reaction mixture.

As can be seen from the above, this invention is admirably suited to the preparation of soluble, high molecular weight phosphonitrilic chlorides from [PNCl$_2$], [PNCl$_2$]$_4$, or mixtures thereof.

The process is preferably conducted in vacuo. In a preferred embodiment, the reation temperature is 220°-270° C.

Our process has all the utilities of the prior art processes referred to above. Furthermore, it can be used to prepare acceptable polymer from trimer or tetramer preparations which do not yield acceptable results by polymerizing according to the prior art. Thus, in addition, our process alleviates the problems of low conversion and low molecular weight product formation associated with prior art processes. Furthermore, through use of our catalysts, good results can be obtained at lower temperatures or in shorter reaction times than required by the prior art.

The products of this invention have the many utilities known for similar products known in the prior art. Thus, they can be reacted to form phosphazenes as disclosed above. These materials can be used as coatings, gasketing materials, fuel tank sealants, expulsion bladders and the like.

Viscous solutions of our phosphonitrilic chlorides can be used in many instances where viscous liquids are employed. Dilute solutions may be employed as liquids in the tubular bubble devices on levels.

DESCRIPTION OF THE PREFERRED EMBODIMENTS

The process of this invention is admirably suited for polymerization of trimeric phosphonitrilic chloride, tetrameric phosphonitrilic chloride, and mixtures thereof. The utility of the process as to these materials suggests use with other lower phosphonitrilic chlorides (PNCl$_2$)$_y$ where y=5 to 7. Thus, in a broad aspect, this invention pertains to polymerization of (PNCl$_2$)$_x$ wherein x=3 to 7. However, in a preferred embodiment x in this formula equals 3 or 4. The trimer and tetramer are generally more available, and accordingly they are more preferred as starting materials.

The starting materials can be prepared by conventional methods. Methods are known for preparing relatively high amounts of cyclic materials; confer U.S. Pat. Nos. 3,575,693, 3,669,663 and 3,694,171. The cyclics can be fractionated from the linears with aliphatic hydrocarbons such as heptane or petroleum ether as is well known. Thereafter, the starting material can be further purified as set forth in Allcock's book, supra, pages 309-310.

The polymerization can be conducted by heating the starting material in sealed tubes in the absence or substantial absence of added solvent.

The process of this invention is best conducted in the substantial absence of H$_2$O and oxygen. By substantial absence, we mean less than about 0.1 weight percent. The desired low amounts of these materials can be achieved by the procedures set forth in Allcock, pages 309-310, supra.

The polymerization rates of phosphonitrilic chloride trimer and tetramer are very slow at ordinary temperatures. Hence, we employ somewhat elevated temperatures in our process. Temperature is not critical, and in general, we employ temperatures which afford a reasonable rate of reaction but which do not afford an untoward amount of undesirable side reaction such as depolymerization. A temperature of about 200° C. to about 350° C. should be satisfactory in most instances. We prefer temperatures less than 300° C. and in a preferred embodiment we employ temperatures of from about 220° to about 270° C.

The reaction pressure is not critical. Thus, the process can be conducted at ambient pressures or superatmospheric pressures or under vacuum. When using an appreciable pressure, say from 100 mm Hg. or higher, an inert gas atmosphere is efficaciously employed. Likewise, inert gases can be used to provide a protective atmosphere when admixing materials to be subjected to polymerization conditions at low vacuum. Nitrogen is a suitable inert atmosphere, but other materials such as argon and neon can be used when desired. (As shown in the example, maintaining the same for two hours under nitrogen at very low vacuum prior to polymerization is an expedient which can be used. Allcock, pages 309-310, supra, discloses another degassing procedure. When the polymerization is conducted under vacuum, the pressure range is preferably from 100 mm Hg. to 10$^{-3}$ mm Hg. and more preferably from 10$_{-2}$ to 10$^{-6}$ mm Hg.

The reaction time is not a truly independent variable, but depends at least to some extent, on other reaction variables such as temperature and catalyst concentration and activity. In general, higher temperatures afford reaction in shorter times. In many instances suitable reaction has occurred in 2-200 hours with 12-48 hours being a preferred range.

As catalysts we employ aprotic halogen acceptors. Typical catalysts are Lewis acids and are simple halides of Group IB, IIB, IIIA, IVA and VIII elements. By simple halides, we mean compounds solely composed of halogen and an element of the aforementioned groups of the Periodic Table. Preferred simple halide catalysts are represented by MX$_y$ where X is F, Cl, Br, or I; more preferably, bromine and chlorine and most preferably Cl; M is copper, mercury, boron, aluminum, gallium, silicon, tin, iron, cobalt or nickel, and y is the valence of the metal. Of these catalysts, we prefer aluminum halides. Boron trifluoride is a catalyst; it may also be used as the complex formed with diethyl ether, or the like. Iron, cobalt and nickel halides may be used as well as boron and tin halides. Of these, the iron, cobalt, and nickel compounds are preferred. The most preferred catalyst is aluminum chloride.

The amount of catalyst employed is an amount which is enough to afford a catalytic effect but not enough to yield the type of products set forth by Paddock, supra, as the major product. Those prior art materials are made by heating phosphonitrilic chloride with an amount of halide which is one-quarter or more by weight of the amount of (PNCl$_2$)$_3$ employed. It is an important feature of our invention that the catalyst employed can be at concentrations much less than the amount of halide employed by Paddock. This is demonstrated graphically by comparing the Example below with Paddock, supra. As shown by our Example, about 1 milligram of AlCl₃ catalyzed a 19.75 gram portion of (PNCl₂)₃.

Thus, we can use much less catalyst, e.g. from about 5 to about 1000 ppm, or more preferably from about 50 to about 500 ppm of catalyst, based on the weight of phosphonitrilic chloride to be polymerized can be used.

The soluble polymer produced by the process of this invention is typically soluble in benzene, toluene or tetrahydrofuran. They are believed to be largely linear in nature but this invention is not based solely on any particular product structure. The product may contain some branching or PN rings in addition to linear segments. In general, the polymer has the formula $(PNCl_2)_n$ where n is from about 50 to 20,000 or even up to 50,000 repeating units. The weight average molecular weight can be $1 \times 10^6$ to $2 \times 10^6$. In view of this high molecular weight, the degree of polymerization can be followed by intrinsic viscosity. The weight average molecular weight of preferred products is from about $10^5$ to about $10^7$.

The soluble polymer product can be precipitated from toluene by addition of n-heptane, U.S. Pat. No. 3,755,537.

EXAMPLE 1

A 19.75 g (56.8 mmoles) sample of heptane-recrystallized phosphonitrilic chloride trimer (mp 109°–111° C., 100 percent trimer by VPC analysis) and a 1.02 mg ($7.65 \times 10^{-3}$ mmoles) sample of reagent grade AlCl₃ were combined in a Pyrex tube under a dry nitrogen atmosphere. The sample was placed under high vacuum ($P < 10^{-4}$ torr) for two hours after which the tube was sealed and placed in an oven at 250° C. ($\pm 5$ C.°) for 48 hours. The resulting colorless sample was part glass and part liquid at 250° C.

In another experiment, a 23.60 g (68.0 mmoles) sample of the same phosphonitrilic chloride trimer in a Pyrex tube was placed under the same high vacuum for two hours as above, the tube was sealed and then heated at 242° C. for 48 hours in the absence of AlCl₃. Upon removal from the oven, the sample was a colorless, low viscosity liquid.

After cooling, each sample was dissolved in 150 ml of toluene (distilled from CaH₂), and the high molecular weight polymer was precipitated with the addition of 330 ml of heptane (distilled from P₂O₅). The solution was decanted from the precipitated polymer and the polymer was washed with heptane (2×25 ml). The decantate and washings were combined and stripped of solvent to yield the PNCl₂ oligomers. The high polymer was dried under vacuum overnight before weighing. The high polymer was then dissolved in sufficient toluene to give a 5 weight percent solution. The viscosity of this solution was measured at 20° C. using an Ostwald viscometer. The following table summarizes the results of the two experiments.

|  | Percent Conversion to High Polymer | Solution Viscosity (cs) | VPC Analysis of Recovered Oligomer | | | |
|---|---|---|---|---|---|---|
|  |  |  | Trimer | Tetramer | Pentamer | Hexamer |
| [PNCl₂] | 5.5 | 10.0 | 97.5 | 2.2 | 1.6 | — |
| [PNCL₂] with AlCl₃ | 41.9 | 92.5 | 75.0 | 1.9 | 1.4 | 2.8 |

As can be seen, a much higher yield of polymer is produced with the AlCl₃ catalyst; this demonstrates the utility of our process. The polymerization was conducted as above in the substantial absence of water, oxygen and solvent.

Similar results are obtained using reaction temperatures of 220°–270° C.

Similar results are obtained using from about 5 to about 5000 parts per million (based on the weight of (PNCl₂)₃ of AlCl₃, AlBr₃ or AlI₃).

Similar results are obtained when the catalyst employed is from 5–1000 ppm by weight and selected from GaCl₃, SnCl₄, BF₃, BCl₃, FeCl₃, CoCl₃, CuCl, NiCl₂, SiCl₄, AsCl₃, and HgCl₂.

Similar results are obtained when the trimeric phosphonitrilic chloride in the above example is replaced with tetrameric phosphonitrilic chloride, or a mixture of the trimer and tetramer with 10 weight percent, 20 weigh percent and 30 weight percent tetramer.

Similarly, the above catalysts in the above amounts can be added to the (PNCl₂)ₓ starting material polymerized according to the procedure of Example 1 of U.S. Pat. No. 3,515,688 and the Examples in South African 72 02893. When so used, the catalysts can provide polymerization of the desired type from starting materials that do not polymerize correctly when the non-catalyzed prior art process is employed.

The high molecular weight polymer produced by the AlCl₃ catalyzed treatment of the above Example can be used to prepare the elastomers set forth in U.S. Pat. No. 3,515,688 as well as the others set forth at pages 356–361 of Allcock's book, supra.

We claim:

1. A process for making a non-oil, substantially linear, high molecular weight phosphonitrilic chloride polymer, said polymer being soluble in benzene, toluene and tetrahydrofuran, said process comprising heating a purified phosphonitrilic chloride of the formula:

$(PNCl_2)_x$ wherein x is an integer from 3–7 inclusive and mixtures thereof, at a temperature of about 200°–300° C. in the presence of a catalytic amount of an aprotic Lewis Acid catalyst selected from the group consisting of cobalt, nickel, boron, copper, gallium, silicon, arsenic and mercury halides and mixtures thereof, said catalytic amount being less than the amount which yields endcapped oily polymers as the major product and being within the range of 5–1000 parts per million parts of said phosphonitrilic chloride and separating a substantially linear high molecular weight non-oil phosphonitrilic chloride polymer, said polymer being further characterized by being soluble in benzene, toluene and tetrahydrofuran.

2. A process of claim 1 wherein said Lewis Acid catalyst is a boron halide.

3. A process of claim 2, wherein said catalytic amount is about 50–500 parts per million parts of said phosphonitrilic chloride.

4. A process of claim 2, wherein said temperature is about 220°–270° C.

5. A process of claim 2 wherein said boron halide catalyst is boron fluoride.

6. A process of claim 2 wherein said boron halide is boron chloride.

7. A process of claim 1 wherein said Lewis Acid catalyst is a gallium halide.

8. A process of claim 7 wherein said gallium halide is gallium chloride.

9. A process of claim 1 wherein said Lewis Acid catalyst is a nickel halide.

10. A process of claim 1 wherein said Lewis Acid catalyst is a cobalt halide.

11. A process of claim 1 wherein said catalytic amount is about 50–500 parts per million parts of said phosphonitrilic chloride.

12. A process of claim 11 wherein said temperature is about 220°–270° C.

13. A process of claim 12 wherein said purified phosphonitrilic chloride is made by a process which comprises recrystallizing cyclic phosphonitrilic chloride trimer.

14. A process of claim 1 wherein said purified phosphonitrilic chloride is made by a process which comprises recrystallizing cyclic phosphonitrilic chloride trimer.

15. A process of claim 1 wherein said purified phosphonitrilic chloride is selected from the group consisting of phosphonitrilic chloride trimer, tetramer and mixtures thereof.

16. A process of claim 15 wherein said halide is chloride.

17. A process of claim 15 wherein said catalytic amount is about 50–500 parts per million parts of said phosphonitrilic chloride.

18. A process of claim 15 wherein said temperature is about 220°–270° C.

19. A process of claim 18, wherein said purified phosphonitrilic chloride is purified phosphonitrilic chloride trimer.

20. A process for polymerizing cyclic $(PNCl_2)_x$ in which x is an integer from 3 to 7 which comprises heating said $(PNCl_2)_x$ in the presence of an effective amount of a catalyst comprising a Lewis Acid compound selected from the group consisting of boron halides represented by the formula $MX_y$ wherein X is selected from the group consisting of F, Cl and Br, M is boron and y is the valence of M and at temperatures of 200°–300° C. to produce a substantially linear $(PNCl_2)_n$ polymer in which n is from about 50 up to 50,000.

21. The process of claim 20 wherein the amount of catalyst present is about 5 to about 1000 parts per million parts of $(PNCl_2)_x$.

22. The process of claim 20 wherein x is an integer selected from the group consisting of 3, 4, and mixtures of 3 and 4.

23. The process of claim 21 wherein the amount of catalyst present is about 50 to about 500 parts per million parts of $(PNCl_2)_x$.

* * * * *